United States Patent [19]

Read

[11] Patent Number: 6,127,060
[45] Date of Patent: Oct. 3, 2000

[54] RECHARGE CATALYST WITH THIN FILM LOW CORROSION COATING, METAL-AIR ELECTRODE INCLUDING SAID CATALYST AND METHODS FOR MAKING SAID CATALYST AND ELECTRODE

[75] Inventor: Jeffrey A. Read, Woodstock, Ga.

[73] Assignee: AER Energy Resources, Inc., Smyrna, Ga.

[21] Appl. No.: 09/098,786

[22] Filed: Jun. 17, 1998

[51] Int. Cl.$^7$ ....................................................... H01M 4/86
[52] U.S. Cl. ................................ 429/40; 429/27; 429/42; 429/44; 502/527.15; 502/305
[58] Field of Search ............................... 502/527.15, 305; 429/27, 40, 42, 44, 148; 204/290 R, 291

[56] References Cited

U.S. PATENT DOCUMENTS

| | | | |
|---|---|---|---|
| 3,592,695 | 7/1971 | Moran | 136/86 |
| 3,977,901 | 8/1976 | Buzzelli | 429/40 |
| 4,341,848 | 7/1982 | Liu et al. | 429/27 |
| 4,380,576 | 4/1983 | Yoshida et al. | 429/27 |
| 4,643,235 | 2/1987 | Schmoede et al. | 429/27 |
| 4,647,359 | 3/1987 | Lindstrom | 204/294 |
| 4,822,699 | 4/1989 | Wan | 429/40 |
| 4,937,220 | 6/1990 | Nickols, Jr. | 502/185 |
| 5,306,579 | 4/1994 | Shepart, Jr. et al. | 429/40 |
| 5,453,169 | 9/1995 | Callstrom et al. | 204/290 R |
| 5,453,332 | 9/1995 | Sakairi et al. | 429/40 |
| 5,506,067 | 4/1996 | Tinker | 429/27 |
| 5,532,086 | 7/1996 | Thibault et al. | 429/245 |
| 5,563,004 | 10/1996 | Buzzelli et al. | 429/27 |

*Primary Examiner*—Bruce F. Bell
*Attorney, Agent, or Firm*—Jones & Askew, LLP

[57] ABSTRACT

A catalyst composition for use in a rechargeable metal-air electrochemical cell comprises an oxygen evolution catalyst coated with a thin film deposition of a binder and an electrically conductive particulate material which is not corroded during charge. This catalyst is useful to make an air electrode which has greater corrosion protection than an air electrode having an oxygen evolution catalyst without the thin film deposition.

47 Claims, 2 Drawing Sheets

RECHARGE CATALYST WITH THIN FILM LOW CORROSION COATING, METAL-AIR ELECTRODE INCLUDING SAID CATALYST AND METHODS FOR MAKING SAID CATALYST AND ELECTRODE

FIELD OF THE INVENTION

This invention relates to rechargeable metal-air cells, and more particularly, relates to the composition and manufacture of an air electrode for use in a metal-air cell.

BACKGROUND OF THE INVENTION

Metal-air cells have been recognized as a desirable means by which to power portable electronic equipment such as personal computers because such cells have a relatively high power output with relatively low weight as compared to other types of electrochemical cells. Metal-air cells utilize oxygen from the ambient air as a reactant in the electrochemical process rather than a heavier material such as a metal or metallic composition.

Metal-air cells use one or more air permeable cathodes separated from a metallic anode by an aqueous electrolyte. During the operation of a metal-air cell, such as a zinc-air cell, oxygen from the ambient air is converted at the cathode to hydroxide ions and zinc is oxidized at the anode and reacts with the hydroxide ions, such that water and electrons are released to provide electrical energy.

Recently, metal-air recharging technology has advanced to the point that metal-air cells are rechargeable and are useful for multiple discharge cycles. An electronically rechargeable metal-air cell is recharged by applying voltage between the anode and the cathode of the cell and reversing the electrochemical reaction. Oxygen is discharged back to the atmosphere through the air-permeable cathode and hydrogen is vented out of the cell.

Metal-air cells may be arranged in multiple cell battery packs to provide a sufficient amount of power output for devices such as computers. An example of a metal-air power supply is found in commonly owned U.S. Pat. No. 5,354,625 to Bentz et al., entitled Metal-Air Power Supply and Air Manager System, and Metal-Air Cell for Use Therein, the disclosure of which is incorporated herein by reference.

Currently, however, the air permeable cathodes suffer from corrosion problems. One possible mechanism suggested for this corrosion involves attack of the carbon particles by reactive species generated on the charge package materials during charge. This corrosion of the carbon located within the cathode shortens the life expectancy of the cell.

Accordingly, there is a need for reducing the amount of corrosion in the metal-air cells to thereby increase the lifetime of the cell without compromising the efficiency of the cell.

SUMMARY OF THE INVENTION

The present invention fulfills the above-described need by providing a catalyst composition for use in a rechargeable metal-air electrochemical cell comprising an oxygen evolution catalyst coated with a binder and an electrically conductive trapping material which resists corrosion caused by reactive species. This invention also encompasses methods for making this coated catalyst and a cathode using the coated catalyst. Unexpectedly, a metal-air cell including the coated oxygen evolution catalyst reduces corrosion within the air cathode thereby increasing the life expectancy of the battery and preventing a loss of power.

The coating on the oxygen evolution catalyst desirably has a thickness from about 1 to about 10 $\mu$m, and preferably has a thickness of about 5 $\mu$m. More particularly, the coating is a film comprising an electrically conductive trapping material and a binder, wherein the trapping material is substantially inert and therefore helps prevent corrosion of carbon particles within the electrode due to reactive species. Desirably, the coating is constructed and arranged such that the coating traps reactive species produced at the oxygen evolution catalyst during use of the metal-air cell for a time sufficient to permit the reactive species to react with one another. The coating is applied using known coating techniques. Preferably, the oxygen evolution catalyst is admixed with the binder and the trapping material in order to coat the oxygen evolution catalyst.

A bifunctional air electrode of this invention includes the above-described coated oxygen evolution catalyst. More particularly, the bifunctional air electrode of the present invention comprises an active layer comprising an oxygen reduction catalyst and an oxygen evolution catalyst. The oxygen evolution catalyst is coated with the coating comprising the binder and the trapping material. In addition, the bifunctional air electrode includes a current collector in electrical contact with the bifunctional electrode and a wet-proofing layer laminated to the active layer. More particularly, the active layer of the bifunctional air electrode further comprises carbon black and non-wetting agent/binder such as polytetrafluoroethylene.

Still more particularly, in a bifunctional air electrode made according to an embodiment of the present invention, the coated oxygen evolution catalyst is present in an amount from about 2 to about 20% by weight of the active layer, the oxygen reduction catalyst is present in an amount from about 2 to about 20% by weight of the active layer, the carbon black is present in an amount from about 60 to about 90% by weight of the active layer, and a non-wetting agent/binder is present in an amount from about 16 to about 40% by weight of the active layer. Most particularly, in a bifunctional air electrode made according to an embodiment of the present invention, the coated oxygen evolution catalyst is present in an amount of 5% by weight of the active layer, the oxygen reduction catalyst is present in an amount of 5% by weight of the active layer, the carbon black is present in an amount of 70% by weight of the active layer, and the non-wetting agent/binder is present in an amount of 20% by weight of the active layer.

The bifunctional air electrode of the present invention is made according to a process comprising admixing the oxygen reduction catalyst with the coated oxygen evolution catalyst to form an active layer mixture, forming a laminate comprising an active layer made with the active layer mixture and a wet-proofing layer, and positioning a current collector in electrical contact with the air electrode. The oxygen evolution catalyst is coated before the admixing step. Still more particularly, the admixing step further comprises admixing carbon black and a non-wetting agent/binder, such as polytetrafluoroethylene, with the coated oxygen evolution catalyst and oxygen reduction catalyst.

Accordingly, an object of the present invention is to provide a metal-air cell having reduced corrosion.

Another object of the present invention is to provide a metal-air cell with an increased cycle life and steady power output.

Other objects, features and advantages of the present invention will become apparent from the following detailed description, drawings, and claims.

DETAILED DESCRIPTION

As summarized above, this invention encompasses a catalyst composition for use in a rechargeable metal-air electrochemical cell, a method for making that catalyst composition, an air electrode comprising, in part, the catalyst composition, and a method for making the air electrode. Embodiments of this invention are described in detail below. First, a cathode made according to an embodiment of the present invention is described followed by descriptions of the method for making the catalyst composition and air electrode and a description of a metal-air cell including the air electrode of this invention.

Figure 1:
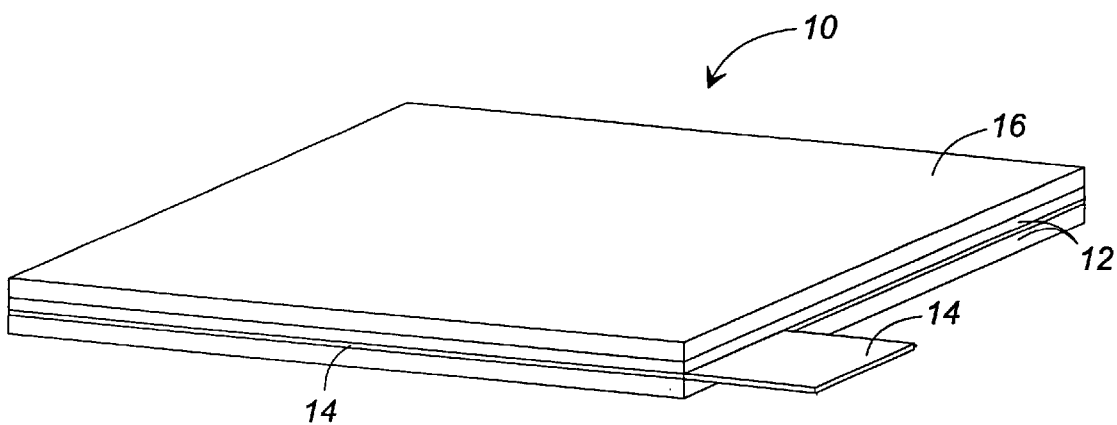
FIG. 1 is a perspective view of a bifunctional air electrode made according to an embodiment of the present invention.

Turning to FIG. 1, a bifunctional air electrode 10 made according to an embodiment of this invention is shown and comprises a current collector 14 located within a wet-proofing layer 12 and an active layer 16 laminated to the wet-proofing layer.

Generally described, the wet-proofing layer 12 is substantially liquid-impermeable and gas permeable. The wet-proofing layer 12 preferably includes untreated carbon black, such as Shawinigan acetylene black in an amount from about 50 to about 80% by weight and a binder/non-wetting agent such as polytetrafluoroethylene in an amount from about 20 to about 50% by weight. More preferably, the wet-proofing layer comprises about 75% by weight of carbon black and about 25% by weight of polytetrafluoroethylene.

The current collector 14 is preferably a nickel plated screen or nickel expanded metal. Suitable current collectors are effective conductors of electric current but are inert to the electrolyte and other components of the metal-air cell in which the air electrode 10 is used.

The active layer 16 of the air electrode 10 comprises a mixture of one or more oxygen reduction catalysts, one or more oxygen evolution catalysts, a coating including an electrically conductive trapping material and a binder on the oxygen evolution catalyst, an oxygen adsorptive particulate material, such as carbon black, and a binder/non-wetting agent. Preferably, the oxygen reduction catalyst and oxygen evolution catalyst are distributed throughout the active layer 16 of the air electrode 10.

Suitable oxygen evolution catalysts are of a type and are present in the active layer in an amount effective to evolve oxygen during recharge of a metal-air cell and carry the electrolytic reaction during recharge at a lower oxygen evolution potential than that of the oxygen reduction catalysts so that the oxygen reduction catalysts do not participate in the electrolytic recharge reaction. Oxygen evolution catalysts for use in the present invention include, but are not limited to, tungsten compounds, such as tungsten carbide (WC), tungsten carbide with 1 to 20% by weight fused cobalt, $CoWO_4$, and $FeWO_4$, and mixtures thereof. Another suitable oxygen evolution catalyst is nickel sulfide (NiS) which also protects the silver oxygen reduction catalyst. The oxygen evolution catalysts are preferably present throughout the active layer 16 of the air electrode 10 in an amount sufficient to prevent the oxygen reduction catalysts from participating in the electrolytic reaction during recharge of the cell.

The oxygen evolution catalysts desirably are first coated with a coating of a binder and an electrically conductive trapping material prior to being mixed with the other air electrode ingredients. When added to the active layer in a sufficient amount, the coating of a binder and an electrically conductive trapping material surprisingly reduces the amount of corrosion in the metal-air cell. The coating is applied to the oxygen evolution catalyst using known coating techniques. Preferably, the catalyst is admixed with the binder and the trapping material. The respective densities of the catalyst, binder and trapping material ensure that the catalyst is coated when a low volume percent of catalyst is used with a high volume percent of binder/trapping material. Preferably, about 15 to 25% by volume of catalyst is admixed with about 70 to 80% by volume of an electrically conductive trapping material and about 5 to 10% by volume of a binder/non-wetting agent. More preferably about 20% by volume of the catalyst is admixed with about 75% by volume of the trapping material and about 5% by volume of the binder/non-wetting agent. By controlling the volume percents used, the coating of the catalyst is easy to achieve.

Surprisingly, the coating on the oxygen evolution catalyst in the present invention decreases the corrosion of metal-air cells containing such coated oxygen evolution catalyst. The trapping material is suspended within the binder and, when admixed with the oxygen evolution catalyst, surrounds the catalyst. The binder holds the catalyst and the trapping material together. When these coated oxygen evolution catalysts are used in a normal air electrode, the amount of corrosion of the carbon black within the air electrode is decreased. Not wishing to be bound by any theory, it is our belief that when the electrode is used, the oxygen evolution catalyst produces reactive species, such as oxygen radicals. Since the trapping material of the present invention is substantially inert to reactive species, the coating traps these reactive species produced at the oxygen evolution catalyst during use of the metal-air cell. The species are trapped for a period of time sufficient to permit the reactive species to react with one another to form non-reactive species, which are not corrosive, thereby reducing the amount of corrosion occurring within the air electrode.

Suitable electrically conductive trapping materials are of a type that are substantially inert and therefore resist corrosion. Electrically conductive materials for use in the present invention include, but are not limited to, low surface area carbons, carbon fiber, glassy carbons, graphite, iron oxide, and mixtures thereof. Preferably, the electrically conductive material is graphite. Also, the electrically conductive material is preferably a particulate material.

Suitable binders/non-wetting agents are of a type that effectively trap and support the oxygen evolution catalyst and the trapping material. Binders/non-wetting agents for use in the present invention include, but are not limited to, fluorinated polymers including polytetrafluoroethylene (PTFE), polyvinylidenefluoride (PVDF), copolymers of polyvinylidenefluoride, copolymers of hexafluoropropylene (HFP) and fluorinated ethylene propylene (FEP), fibrillated polyethylene, and mixtures thereof. The preferred binder/non-wetting agent is polytetrafluoroethylene.

Suitable oxygen reduction catalysts are of a type and are present in an amount effective to produce a satisfactory level of current on the first and subsequent discharge cycles of the metal-air cell in which the air electrode is used. Oxygen reduction catalysts for use in the present invention include, but are not limited to, silver, cobalt oxides or spinels having the formula $Co_xO_y$, transition metal macrocyclics such as cobalt tetramethoxyphenylporphyrin (CoTMPP), and perovskites such as lanthanum/nickel/cobalt oxide ($LaNi_{1-x}Co_xO_y$) or lanthanum/iron/cobalt oxide ($LaFe_{1-x}Co_xO_y$), and mixtures thereof.

The oxygen absorptive particles in the active layer 16 of the air electrode 10 are preferably carbon black. Suitable carbon black has a surface area greater than 60 square meters per gram. Desirably, the carbon black is a fluffy form of carbon black comprising discreet particles in a chain-like structure, such as Shawinigan AB-50 acetylene black available from Chevron Chemical Company.

The relative amounts of the components of the active layer 16 may vary. Preferably, however, the coated oxygen evolution catalyst is present in the active layer 16 of the air electrode 10 in a total amount from about 2 to about 20% by weight of the active layer, the oxygen reduction catalyst is present in the active layer in a total amount from about 2 to about 20% by weight of the active layer, the carbon black is present in an amount from about 60 to about 90% by weight of the active layer, and the polytetrafluoroethylene is present in the active layer in a total amount from about 16 to about 40% by weight of the active layer. Preferably, the coated oxygen evolution catalyst is present in an amount of 5% by weight of the active layer, the oxygen reduction catalyst is present in an amount of 5% by weight of the active layer, the carbon black is present in an amount of 70% by weight of the active layer, and the non-wetting agent/binder is present in an amount of 20% by weight of the active layer.

The bifunctional air electrode 10 can be made by conventional methods known to those skilled in the art such as filtration using methanol or water or both as a solvent and the wet paste method using methanol or water as a solvent. U.S. Pat. No. 4,152,489 discloses a suitable wet paste method and the disclosure of such patent is expressly incorporated herein by reference. Desirably, however, the air electrode is made by the a dry press method described in Example 1 hereinbelow.

Figure 2:
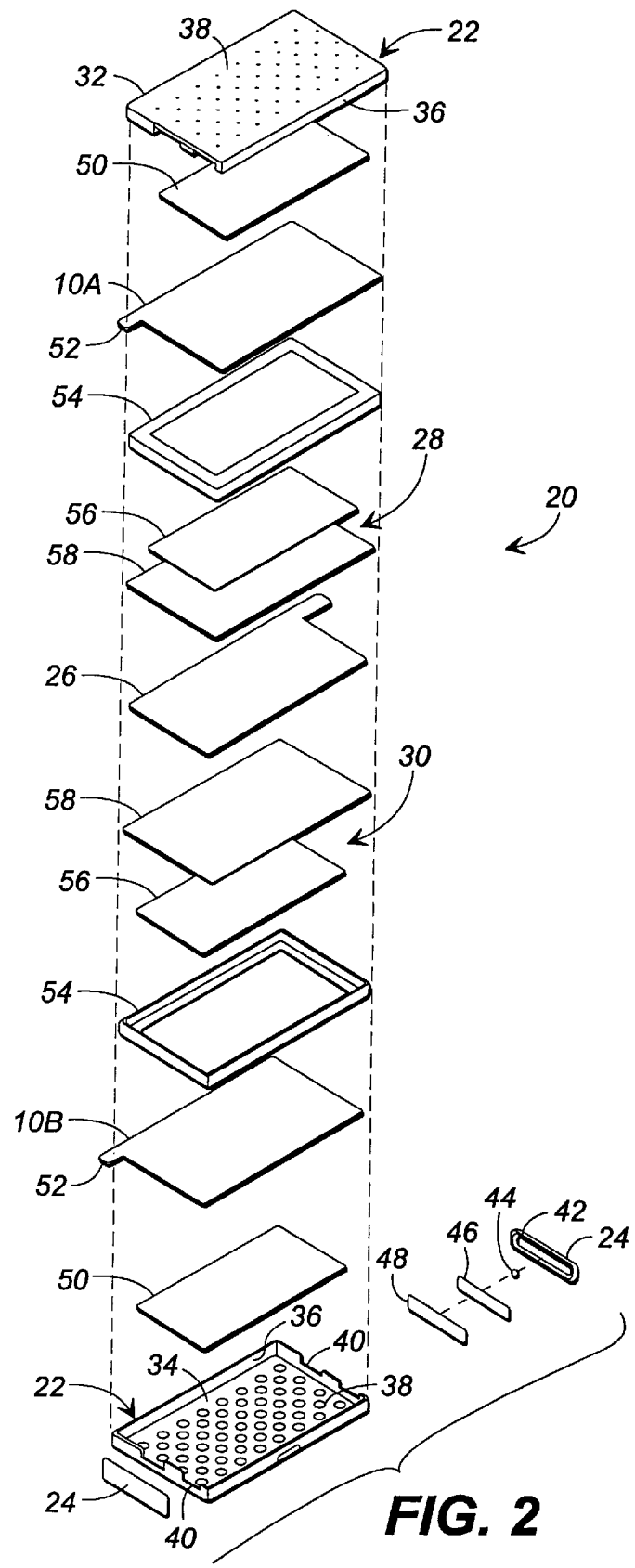
FIG. 2 is an exploded view of the elements of a metal-air cell including a pair of bifunctional air electrodes such as the electrode illustrated in FIG. 1.

Turning to FIG. 2, a zinc-air cell 20 is illustrated in exploded view and includes a pair of air electrodes 10A and 10B having the same structure as the air electrode 10 as illustrated in FIG. 1 and described above. Generally described, the zinc-air cell 20 comprises a cell casing 22, one or more vent caps 24, a dual anode 26, and a pair of separators 28 and 30. The cell case 22 is filled with aqueous electrolyte. Although the metal-air cell 20 described herein is a zinc-air cell, it should be understood that the recharge catalyst composition and air electrode of the present invention is applicable to other types of metal-air cells.

The cell case 22 is a multi-piece structure comprising a first air electrode mask wall 32, a second air electrode mask wall 34 opposite the first air electrode mask wall, and a plurality of side walls 36 connecting the first and second mask walls so as to form a prismatic cell case. The cell case 22 is desirably molded from a lightweight plastic, such as polypropylene, which is inert to the electrolyte in the cell case. The respective elements of the cell case 22 are sealed together with a hot melt process or other sealing method.

Each air electrode mask wall 32 and 34 has a plurality of conically-shaped openings 38 to allow air flow or diffusion through the cell case 22 to the air electrodes 10A and 10B of the cell 20. The air openings 38 are desirably evenly spaced across the respective mask walls 32 and 34. The size, number, and shape of air openings 38 in the mask walls 32 and 34 are selected such that sufficient oxygen reaches the air electrodes 10A and 10B through the mask walls to generate the desired current from the cell while preventing excessive moisture transfer into or out of the cell 20 through the mask walls. In addition, the size, number, and shape of the openings 38 and the mask walls 32 and 34 is such that sufficient lateral distribution of oxygen through to the cell is achieved while the thickness of the cell is minimized. Suitable size, number, and shape of the air openings 38 vary depending on the size and use of the cell; however, a suitable arrangement is disclosed in U.S. Pat. No. 5,629,568, the disclosure of which is expressly incorporated herein by reference.

The side walls 36 of the cell case 22 define one or more apertures 40 for venting gas from the cell and filling the cell 20 with electrolyte. These vent apertures are sealed with the vent caps 24 which are desirably constructed of a lightweight plastic such as polypropylene like the remainder of the cell case. Each vent cap 24 defines one or more gas exit holes 42 and is surrounded by a small recess in the interior of the vent cap. This recess is filled with a secondary vent seal 44 via ultrasonic welding or other bonding means. The secondary vent seal 44 is desirably a hydrophobic, gas permeable membrane, such a polypropylene membrane available from Hoechst Celanese Corporation of Charlotte, N.C. under the trademark CELGARD® 4599. A vent diffusion membrane 46 fits over the secondary vent seal 44 within the vent caps 24 and is desirably a polyvinyl acetate material such as DEXTER 7487 polyvinyl acetate material available from Dexter Corporation of Windsor-Locks, Conn. or Porex polyethylene material available from Porex Technologies, of Fairburn, Ga. The vent diffusion membrane is in turn covered with a primary vent seal 48 which is desirably a microporous polytetrafluoroethylene film. The vent diffusion membrane 46 and the vent seal 48 are desirably attached to the vent cap 24 with adhesives or other bonding methods. The vent caps 24 can also include a plastic vent support frame (not shown) for holding the vent caps in place. A similar vent structure is described in U.S. Pat. No. 5,362,577, the disclosure of which is expressly incorporated herein by reference in its entirety.

The elements of the cell 20 illustrated in FIG. 2 are assembled in sandwich style. The interior surfaces of the air electrode mask walls 32 and 34 are covered with a layer of absorbent diaper material 50 which is desirably a layer of polyacrylic acetate. The absorbent diaper material 50 is attached to the respective mask walls 32 and 34 with adhesive and other bonding means. The absorbent diaper 50 absorbs any electrolyte that might otherwise leak from the cell through the air openings 38 in the mask walls 32 and 34. The absorbent diaper 50 also assists in the lateral diffusion of ambient air that enters through the mask walls and travels to the air electrodes 10A and 10B.

The first and second air electrodes 10A and 10B are disposed in the cell case 22 against respective first and second mask walls 32 and 34 with the absorbent diaper material 50 between each air electrode and the adjacent mask wall. The wet-proofing layer 12 of each air electrode 10A and 10B faces the adjacent mask wall 32 or 34 and the active layer 16 of each air electrode faces the interior of the cell 20. Each air electrode 10A and 10B has a terminal tab extending out of the casing 20 through respective recesses and the casing side walls 36 to provide negative terminals for the cell.

The air electrodes 10A and 10B are held in place in the cell by the application of adhesives or other bonding methods. In addition, the air electrodes 10A and 10B are further held in place adjacent to the respective mask walls 32 and 34 by respective support frames 54 which, likewise, are held in place by the application of adhesives or other bonding methods. The cathode support frames 54 are made of plastic such as polyethylene and extend about the side walls 36 of the cell case 22. Each support frame 54 has a large central opening so as not to cover the respective air electrode 10A and 10B. The support frames 54 provide structural strength to the cell 20 and prevent electrolyte from leaking around the edges of the air electrodes 10A and 10B and out of the cell 20.

The active layers 16 of the air electrodes 10A and 10B are covered with the first and second separator layers 28 and 30. Each separator layer 28 and 30 comprises a layer of an absorbent fibrous web 56 and a layer of a microporous membrane 58 that, when wet, is gas-impermeable and liquid-permeable. A suitable absorbent fibrous web 56 comprises nylon such as that sold by Hollinsworth and Vose under the designation TR1113H, while a desired microporous membrane 58 comprises a polypropylene membrane such as that sold under the name CELGARD ® 5511 by Hoechst Celanese Corporation of Charlotte, N.C. The separator layers 28 and 30 are attached to the air electrodes 10A and 10B and the respective support frames 54 by adhesives or other bonding methods.

The anode 26 is disposed in the cell 20 between the first and second separator layers 28 and 30. A suitable anode includes a layer of zinc attached to a current collector. The zinc can be zinc or zinc alloy metal sheet or can be a zinc powder cake. Desirably, the anode 26 is wrapped in an anode bag made of a layer of absorbent fibrous material and a layer of microporous membrane which is gas-impermeable and liquid-permeable when wet. A suitable absorbent fibrous web material is nylon sold by Hollinsworth and Vose under the designation TR1113G and a suitable microporous membrane for the anode bag is CELGARD® 5511. A particularly suitable anode is a "split" anode assembly as disclosed in U.S. Pat. No. 5,639,568, the disclosure of which is already incorporated herein by reference.

After the anode 26 is in place, the side walls 36 of the casing are heat sealed together to enclose the cell 20. Likewise, the vent caps 24 are sealed. Liquid electrolyte is then poured into the cell casing and is substantially absorbed by the fibrous webs and microporous membranes of the separator layers 28 and 30 and the anode. The cell case 22 is then completely sealed.

A suitable electrolyte is an aqueous base electrolyte including a Group I metal hydroxide. Examples include LiOH, NaOH, KOH, CsOH, or the like.

During operation of the cells 20, air enters through the openings 38 in the mask walls 32 and 34 and penetrates the layers of the air electrodes 10A and 10B. At the air electrodes 10A and 10B, oxygen from the ambient air initiates an electrolytic reaction that results in the production of current from the cell 20. The transfer of ions between the anode 26 and the air electrodes 10A and 10B is accomplished through the electrolyte absorbed in the separator layers 28 and 30 and the separator bag of the anode 26. When the materials are wet, the ions pass through the microporous membranes and fibrous webs in the cell.

The microporous membranes in the separator layers 28 and 30 and the anode bag limit the growth of dendrites on the zinc anode 26 and prevents the dendrites from growing from the anode to the air electrodes 10A and 10B. Any contact between zinc dendrites from the anode 26 and the air electrodes 10A and 10B short circuits the cell 20. The microporous membranes maintain zinc oxide generated at the anode 26 in intimate contact with the anode.

The microporous membranes in the separator layers 28 and 30 and the anode bag also prevent oxygen gas from reaching the anode and self discharging the cell. Oxygen is allowed to reach the anode only in solution.

The absorbent fibrous webs of the separator layers 28 and 30 and the anode bag absorb substantially all of the electrolyte and trap the electrolyte in place between the anode 26 and the air electrodes 10A and 10B so that the cell 20 can operate in any orientation.

The present invention is further illustrated by the following example which is designed to disclose a particular embodiment of the present invention and teach one of ordinary skill in the art how to carry out the present invention. The example is not to be construed in any way as imposing limitations upon the scope of the invention. On the contrary, it is to be clearly understood that resort may be had to various other embodiments, modifications, and equivalents thereof which, after reading the discussion herein, may suggest themselves to those skilled in the art without departing from the spirit of the present invention and/or the scope of the appended claims.

EXAMPLE 1

A bifunctional electrode was made by the dry press method which comprises pressing a dry wet-proofing layer mixture against a current collector followed by pressing a dry active layer mixture against the wet-proofing layer to complete the laminate.

The wet-proofing layer mixture was formed by first mixing 30 grams of Shawinigan AB50 acetylene carbon black with 70 milliliters of distilled water for 20 minutes. This mixture was mixed in a Kitchenaid baking-type mixer with a dough (anchor shape) agitator on speed 2. 130 milliliters of distilled water were added to the composition, which was mixed for an additional 10 minutes. Separately 18 grams of polytetrafluoroethylene 30 having a pH of at least 10 was mixed with 125 milliliters of distilled water and added to the wet-proofing mixture which was then mixed for an additional 40 seconds. The wet-proofing mixture was dried in a convection oven over 20 hours at a temperature of 100° C. The dried mixture was then chopped in a kitchen-type Osterizer blender at crumb setting to a particle size of 180–300 microns.

Component 1 of the dry active layer mixture was formed by mixing 17 grams of NiS, 17 grams of $FeWO_4$, 17 grams of WC with 12% cobalt, and 45 grams of LHPS 454 graphite with enough distilled water to form a paste. This mixture was blended in a Kitchenaid bakingtype mixer with a dough agitator on speed 2 for 10 minutes. 4 grams of polytetrafluoroethylene 30 having a pH of at least 10 was mixed with this paste and blended for 40 seconds. Component 1 of the dry active layer mixture was dried in a convection oven over 20 hours at a temperature of 100° C. The dried mixture was then chopped in a kitchen-type Osterizer blender to a particle size of less than 45 microns.

Component 2 of the dry active layer mixture was formed by mixing 17 grams of Shawinigan AB50 acetylene carbon black with 100 grams of distilled water and a $AgNO_3$ solution containing 2 grams of $AgNO_3$ in 30 grams of distilled water. The mixture was blended in a Kitchenaid baking type mixture with a dough (anchor shape) agitator on speed 2 for 10 minutes. 6 grams of polytetrafluoroethylene 30 having a pH of at least 10 was mixed with this paste and blended for 40 seconds. Component 2 of the dry active layer mixture was dried in a convection oven over 20 hours at a temperature of 100° C. The dried mixture was then chopped in a kitchen-type Osterizer blender at crumb setting to a particle size of 180–300 microns.

The completed dry active layer mixture was formed by mixing 2.4 grams of component 1 with 16.6 grams of component 2. The mixture was blended in a kitchen-type Osterizer blender at crumb setting for 1 minute to evenly distribute the 2 components.

The bifunctional air electrode was formed by spreading 4.3 grams of the dry wet-proofing layer mixture on an expanded nickel current collector having dimensions 7.6 cm by 14 cm. The current collector was rinsed in MeOH prior to the wet-proofing layer being added to the current collector. The wet-proofing layer mixture and current collector were wrapped in stainless steel foil type 321 and placed between plates of a hot hydraulic press. The current collector and wet-proofing layer was then pressed for 15 minutes at 400° F and 9000 psig. 1.9 grams of the dry active layer mixture was then spread on top of the wet-proofing layer and the entire electrode was cold pressed for 10 minutes at 200 psig followed by hot pressing for 15 minutes at 560° F and 8000 psig.

It should be understood that the foregoing relates to a preferred embodiment of the present invention and that numerous changes may be made therein without departing from the scope of the invention as defined by the following claims.

What is claimed is:

1. A coated oxygen evolution catalyst for use in a secondary metal-air electrochemical energy cell comprising an oxygen evolution catalyst and a coating on the oxygen evolution catalyst wherein the coating consists essentially of an electrically conductive trapping material and a binder and wherein the trapping material is substantially inert to reactive species.

2. The coated oxygen evolution catalyst of claim 1, wherein the oxygen evolution catalyst is selected from the group consisting of $FeWO_4$, NiS, WC, WC with 1% to 20% Co, and mixtures thereof.

3. The coated oxygen evolution catalyst of claim 1, wherein the trapping material is a particulate material.

4. The coated oxygen evolution catalyst of claim 3, wherein the trapping material is selected from the group consisting of graphite, amorphous carbons, glassy carbons, carbon fibers, iron oxide, and mixtures thereof.

5. The coated oxygen evolution catalyst of claim 3, wherein the trapping material is graphite.

6. The coated oxygen evolution catalyst of claim 1, wherein the binder is selected from the group consisting of polytetrafluoroethylene, polyvinylidenefluoride, copolymers of polyvinylidenefluoride, copolymers of hexafluoropropylene, fluorinated ethylene propylene, fibrillated polyethylene, and mixtures thereof.

7. The oxygen evolution catalyst of claim 1, wherein the binder is polytetrafluoroethylene.

8. The oxygen evolution catalyst of claim 1, wherein the coating is constructed and arranged such that the coating traps reactive species produced at the oxygen evolution catalyst during use of the metal-air cell for a period of time sufficient to permit the reactive species to react with one another.

9. A bifunctional air electrode for use in a secondary metal-air electrochemical energy cell comprising:
   an active layer comprising an oxygen reduction catalyst and a coated oxygen evolution catalyst disposed in a matrix of carbon particles, wherein the carbon particles are capable of being corroded by reactive species,
   a wet-proofing layer laminated to the active layer; and
   a current collector in electrical contact with either the active layer or the wet-proofing layer;
   wherein the coated oxygen evolution catalyst comprises an oxygen evolution catalyst coated with a coating consisting essentially of an electrically conductive trapping material and a binder and the trapping material is substantially inert to reactive species.

10. The bifunctional air electrode of claim 9, wherein the oxygen evolution catalyst is selected from the group consisting of $FeWO_4$, NiS, WC, WC with 1% to 20% Co, and mixtures thereof.

11. The bifunctional air electrode of claim 9, wherein the trapping material is a particulate material.

12. The bifunctional air electrode of claim 11, wherein the trapping material is selected from the group consisting of graphite, amorphous carbons, glassy carbons, carbon fibers, iron oxide, and mixtures thereof.

13. The bifunctional air electrode of claim 11, wherein the trapping material is graphite.

14. The bifunctional air electrode of claim 9, wherein the binder is selected from the group consisting of polytetrafluoroethylene, polyvinylidenefluoride, copolymers of polyvinylidenefluoride, copolymers of hexafluoropropylene, fluorinated ethylene propylene, fibrillated polyethylene, and mixtures thereof.

15. The bifunctional air electrode of claim 9, wherein the binder is polytetrafluoroethylene.

16. The bifunctional air electrode of claim 9, wherein the oxygen reduction catalyst is selected from the group consisting of silver, cobalt oxides, transition metal macrocyclics, spinels, perovskites, and mixtures thereof.

17. The bifunctional air electrode of claim 9, wherein the oxygen reduction catalyst is silver.

18. The bifunctional air electrode of claim 9, wherein the active layer further comprises a non-wetting agent/binder and wherein the carbon particles which are capable of being corroded are carbon black particles.

19. The bifunctional air electrode of claim 18, wherein the active layer comprises from about 2 to about 20% by weight of the coated oxygen evolution catalyst, from about 2 to about 20% by weight of the oxygen reduction catalyst, from about 60 to about 90% by weight of the carbon black, and from about 16 to about 40% by weight of the non-wetting agent/binder.

20. The bifunctional air electrode of claim 9, wherein the current collector is selected from the group consisting of nickel plated screen and nickel expanded metal.

21. The bifunctional air electrode of claim 9, wherein the wet-proofing layer comprises carbon black and polytetrafluoroethylene.

22. The bifunctional air electrode of claim 21, wherein the current collector is in electrical contact with the wet-proofing layer.

23. The bifunctional air electrode of claim 9, wherein the coating is constructed and arranged such that the coating traps reactive species produced at the oxygen evolution catalyst during use of the metal-air cell for a period of time sufficient to permit the reactive species to react with one another.

24. A method of producing a coated oxygen evolution catalyst for use in a secondary metal-air electrochemical energy cell, the method comprising:
   coating an oxygen evolution catalyst with a coating consisting essentially of a binder and an electrically conductive trapping material, wherein the trapping material is substantially inert to reactive species.

25. The method of claim 24, wherein the oxygen evolution catalyst is selected from the group consisting of $FeWO_4$, NiS, WC, WC with 1% to 20% Co, and mixtures thereof.

26. The method of claim 24, wherein the trapping material is a particulate material.

27. The method of claim 26, wherein the trapping material is selected from the group consisting of graphite, amorphous carbons, glassy carbons, carbon fibers, iron oxide, and mixtures thereof.

28. The method of claim 26, wherein the trapping material is graphite.

29. The method of claim 24, wherein the binder is selected from the group consisting of polytetrafluoroethylene, polyvinylidenefluoride, copolymers of polyvinylidenefluoride, copolymers of hexafluoropropylene, fluorinated ethylene propylene, fibrillated polyethylene, and mixtures thereof.

30. The method of claim 24, wherein the binder is polytetrafluoroethylene.

31. The method of claim 24, wherein the coating is constructed and arranged such that the coating traps reactive species produced at the oxygen evolution catalyst during use of the metal-air cell for a period of time sufficient to permit the reactive species to react with one another.

32. A method of producing a bifunctional air electrode for use in a secondary metal-air electrochemical cell, the method comprising:

coating an oxygen evolution catalyst with a coating comprising a binder and an electrically conductive trapping material wherein the trapping material is substantially inert to reactive species;

thereafter, blending an oxygen reduction catalyst with the coated oxygen evolution catalyst and carbon particles which are capable of being corroded by reactive species to form an active layer;

laminating the active layer onto a wet-proofing layer to form an active/wet-proofing layer; and contacting a current collector with the active/wet-proofing layer.

33. The method of claim 32, wherein the oxygen evolution catalyst is selected from the group consisting of $FeWO_4$, NiS, WC, WC with 1% to 20% Co, and mixtures thereof.

34. The method of claim 32, wherein the trapping material is a particulate material.

35. The method of claim 34, wherein the trapping material is selected from the group consisting of graphite, amorphous carbons, glassy carbons, carbon fibers, iron oxide, and mixtures thereof.

36. The method of claim 34, wherein the trapping material is graphite.

37. The method of claim 32, wherein the binder is selected from the group consisting of polytetrafluoroethylene, polyvinylidenefluoride, copolymers of polyvinylidenefluoride, copolymers of hexafluoropropylene, fluorinated ethylene propylene, fibrillated polyethylene, and mixtures thereof.

38. The method of claim 32, wherein the binder is polytetrafluoroethylene.

39. The method of claim 32, wherein the oxygen reduction catalyst is selected from the group consisting of silver, cobalt oxides, transition metal macrocyclics, spinels, perovskites, and mixtures thereof.

40. The method of claim 32, wherein the oxygen reduction catalyst is silver.

41. The method of claim 32, wherein the active layer further comprises a non-wetting agent/binder and wherein the carbon particles which are capable of being corroded are carbon black particles.

42. The method of claim 41, wherein the active layer comprises from about 2 to about 20% by weight of the coated oxygen evolution catalyst, from about 2 to about 20% by weight of the oxygen reduction catalyst, from about 60 to about 90% by weight of the carbon black, and from about 16 to about 40% by weight of the non-wetting agent/binder.

43. The method of claim 32, wherein the current collector is selected from the group consisting of nickel plated screen and nickel expanded metal.

44. The method of claim 32, wherein the wet-proofing layer comprises carbon black and polytetrafluoroethylene.

45. The method of claim 44, wherein the current collector is in electrical contact with the wet-proofing layer.

46. The method of claim 32, wherein the coating is constructed and arranged such that the coating traps reactive species produced at the oxygen evolution catalyst during use of the metal-air cell for a period of time sufficient to permit the reactive species to react with one another.

47. A bifunctional air electrode for use in a secondary metal-air electrochemical cell made according to the method of claim 32.

* * * * *